(12) United States Patent
Takahashi et al.

(10) Patent No.: US 11,703,418 B2
(45) Date of Patent: Jul. 18, 2023

(54) CONTROLLER FOR INTERNAL COMBUSTION ENGINE

(71) Applicant: Mitsubishi Electric Corporation, Tokyo (JP)

(72) Inventors: Tatsuhiko Takahashi, Kobe (JP); Yuhei Matsushima, Tokyo (JP); Junichi Inoue, Tokyo (JP); Toshikatsu Saito, Tokyo (JP); Keiichi Arita, Tokyo (JP); Kazuyo Kako, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/699,449

(22) Filed: Mar. 21, 2022

(65) Prior Publication Data
US 2022/0373431 A1    Nov. 24, 2022

(30) Foreign Application Priority Data
May 18, 2021  (JP) ................................ 2021-083588

(51) Int. Cl.
*F02D 41/00*    (2006.01)
*G01M 15/06*    (2006.01)
*F02D 41/28*    (2006.01)

(52) U.S. Cl.
CPC ........... *G01M 15/06* (2013.01); *F02D 41/009* (2013.01); *F02D 41/28* (2013.01); *F02D 2041/286* (2013.01); *F02D 2200/024* (2013.01)

(58) Field of Classification Search
CPC ...... F02D 13/02; F02D 13/0215; F02D 35/02; F02D 35/024; F02D 41/00;
(Continued)

(56) References Cited

U.S. PATENT DOCUMENTS 7,958,779 B2 *  6/2011  Nagano .................. G01P 3/489
                                                73/114.25
2017/0204795 A1 *  7/2017  Hagari ................ F02D 41/1497
(Continued)

FOREIGN PATENT DOCUMENTS

JP    2014-20215 A    2/2014
JP    6029726 B1    11/2016

OTHER PUBLICATIONS

Communication dated Jul. 5, 2022 from the Japanese Patent Office in Application No. 2021-083588.

*Primary Examiner* — Hai H Huynh
*Assistant Examiner* — Johnny H Hoang
(74) *Attorney, Agent, or Firm* — Sughrue Mion, PLLC; Richard C. Turner

(57)    ABSTRACT

To provide a controller for internal combustion engine which suppresses that estimation of the combustion state is performed based on the angle information on which the component due to the torsional vibration is superimposed, when the torsional vibration occurs in the crankshaft. A controller for internal combustion engine determines whether a torsional vibration occurs in a crankshaft based on an angle period; calculates a gas pressure torque in burning based on a crank angle acceleration which is calculated based on the angle period; estimates a combustion state of an internal combustion engine based on the gas pressure torque in burning; and stops estimation of the combustion state, when it is determined that the torsional vibration occurred.

7 Claims, 9 Drawing Sheets

(58) Field of Classification Search
CPC ............ F02D 41/0047; F02D 41/0052; F02D 41/009; F02D 41/14; F02D 41/1401; F02D 41/28; F02D 2200/021; F02D 2200/024; F02D 2200/04; F02D 2041/1432; F02D 2041/1433; G01M 15/04; G01M 15/06; F02P 5/15
USPC ................. 123/435; 701/101, 110, 111, 114; 73/114.04, 114.11, 114.26
See application file for complete search history.

(56) References Cited

U.S. PATENT DOCUMENTS

| | | | |
|---|---|---|---|
| 2017/0292466 A1* | 10/2017 | Hagari | F02D 41/009 |
| 2018/0087459 A1* | 3/2018 | Hagari | G01L 3/04 |
| 2019/0264624 A1* | 8/2019 | Hagari | F02D 35/028 |
| 2022/0220910 A1* | 7/2022 | Matsushima | F02P 5/15 |

* cited by examiner

| θd | ... | -4 | 0 | 4 | ... | 176 | 180 | 184 | ... |
|---|---|---|---|---|---|---|---|---|---|
| Trk_mot | ... | ○○ | ○○ | ○○ | ... | ○○ | ○○ | ○○ | ... |

SETTING DATA

CONTROLLER FOR INTERNAL COMBUSTION ENGINE

INCORPORATION BY REFERENCE

The disclosure of Japanese Patent Application No. 2021-83588 filed on May 18, 2021 including its specification, claims and drawings, is incorporated herein by reference in its entirety.

BACKGROUND

The present disclosure relates to a controller for internal combustion engine.

In order to improve the fuel consumption performance and the emission performance of the internal combustion engine, the method of measuring the combustion state of the internal combustion engine and carrying out feedback control of the measuring result is effective. For that purpose, it is important to measure the combustion state of the internal combustion engine accurately. It is known widely that the combustion state of the internal combustion engine can be measured accurately by measuring a cylinder pressure. As the measurement method of the cylinder pressure, besides the method of measuring directly based on the cylinder pressure sensor signal, there is the method of estimating the gas pressure torque based on the information on each mechanism of the internal combustion engine, such as the crank angle signal.

As the conventional technology, for example, JP 6029726 B discloses the combustion state estimation apparatus which estimates the combustion state based on the output signal of the crank angle sensor.

SUMMARY

By the way, a torsional vibration may occur in the crankshaft. When the torsional vibration occurred, a component due to the torsional vibration is superimposed on the detected crank angle information besides the information due to burning. In the torsional vibration of the crankshaft, a component of the resonance frequency of the torsional vibration system around the crankshaft becomes large. For example, when the torsional vibration occurs in swing back after misfire, the crank angle period is varied in spite of the same combustion state, and estimation accuracy of the cylinder internal pressure and the combustion state is deteriorated. However, in JP 6029726 B, deterioration of the estimation accuracy of the combustion state due to the torsional vibration is not considered. And, control is performed erroneously, based on the combustion state whose estimation accuracy is deteriorated due to the torsional vibration.

Then, the purpose of the present disclosure is to provide a controller for internal combustion engine which suppresses that estimation of the combustion state is performed based on the angle information on which the component due to the torsional vibration is superimposed, when the torsional vibration occurs in the crankshaft.

A controller for internal combustion engine according to the present disclosure including:

an angle information detection unit that detects a crank angle and an angle period which is a period of unit angle of a crankshaft, based on an output signal of a crank angle sensor;

a torsional vibration determination unit that determines whether a torsional vibration occurs in the crankshaft, based on the angle period;

an angle information calculation unit that calculates a crank angle acceleration, based on the angle period;

a gas pressure torque calculation unit that calculates a gas pressure torque in burning which is generated by a gas pressure in cylinder in burning, at each crank angle of arithmetic object, based on the crank angle acceleration; and a combustion state estimation unit that estimates a combustion state of an internal combustion engine, based on the gas pressure torque in burning, wherein when it is determined that the torsional vibration occurred, the combustion state estimation unit stops estimation of the combustion state.

According to the controller for internal combustion engine of the present disclosure, it is determined based on the angle period whether the torsional vibration occurs in the crankshaft. And, when it is determined that the torsional vibration occurred, estimation of the combustion state based on the angle period is stopped. Accordingly, it can be suppressed that the combustion state whose accuracy is deteriorated due to the component of the torsional vibration is estimated.

DETAILED DESCRIPTION OF THE EMBODIMENTS

1. Embodiment 1

Figure 1:
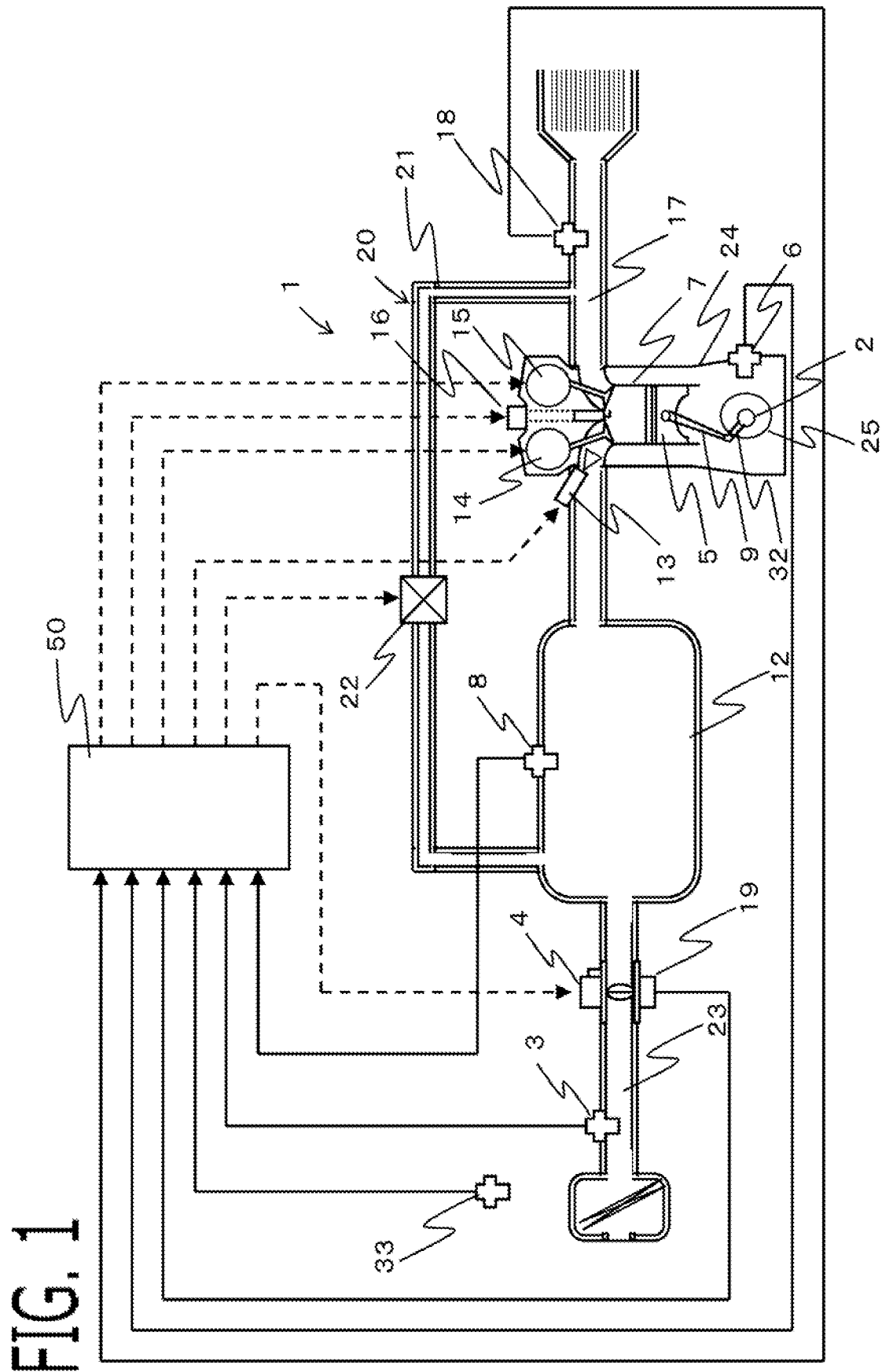
FIG. 1 is a schematic configuration diagram of the internal combustion engine and the controller according to Embodiment 1.
Figure 2:
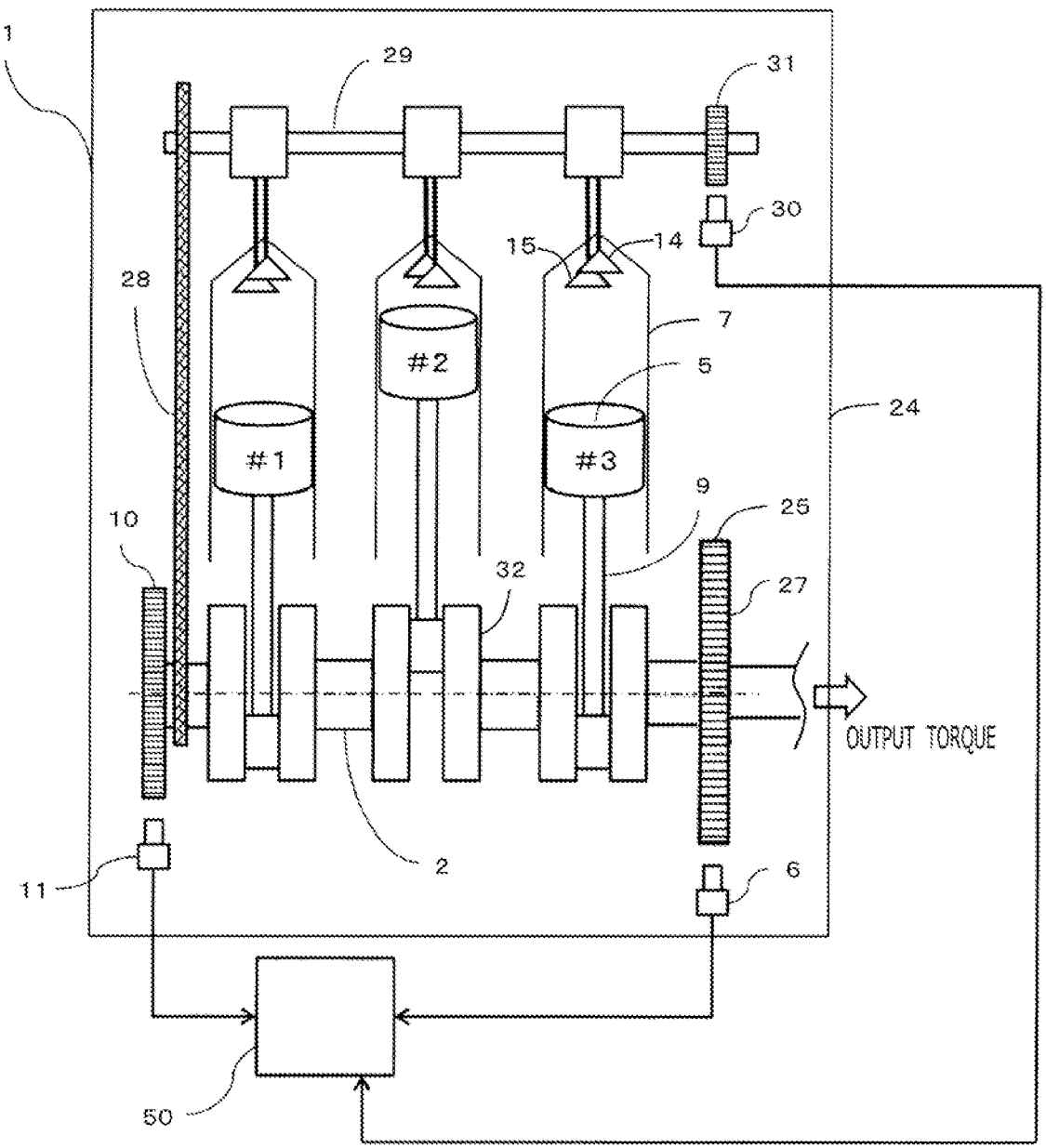
FIG. 2 is a schematic configuration diagram of the internal combustion engine and the controller according to Embodiment 1.
Figure 3:
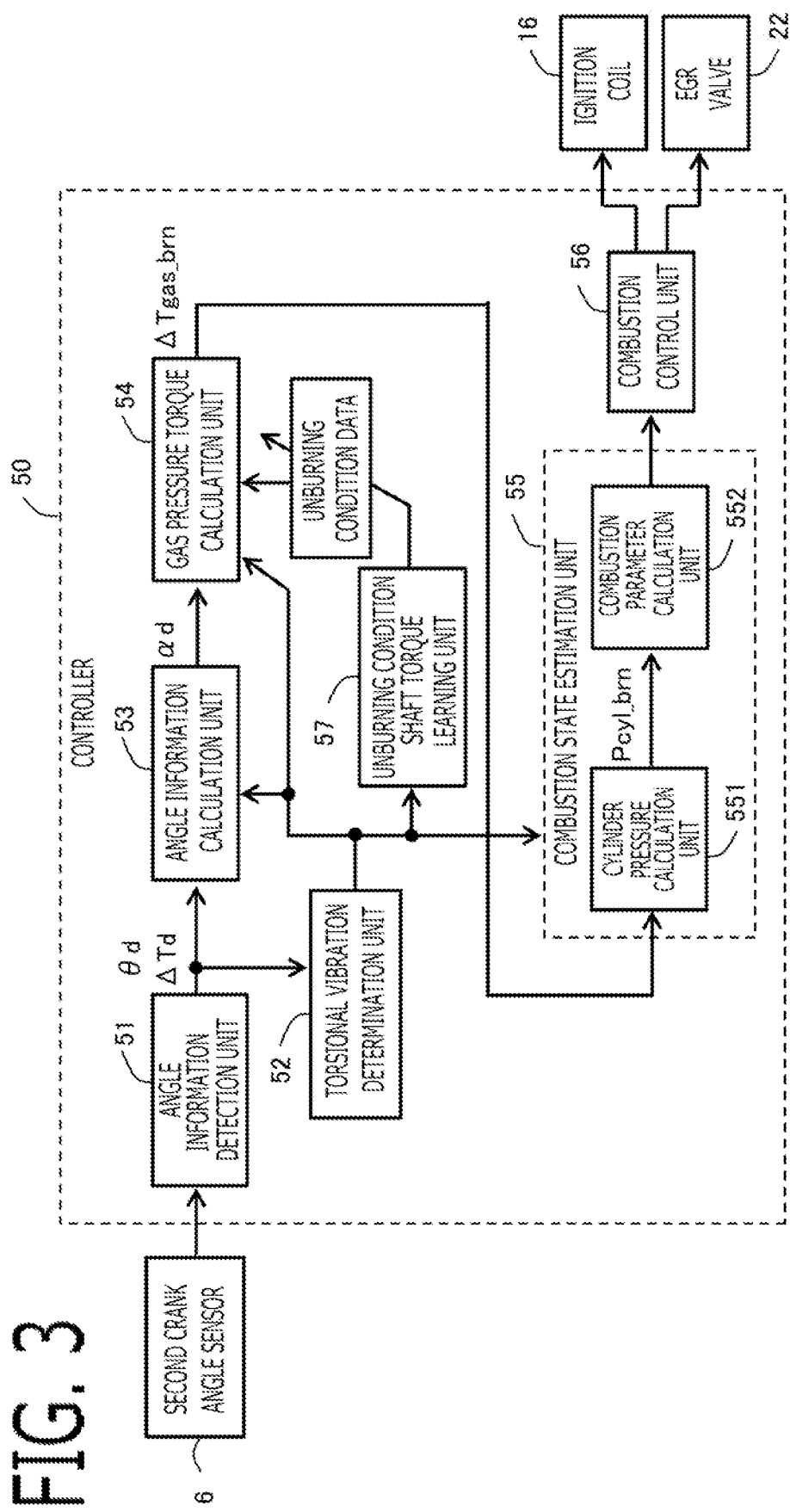
FIG. 3 is a block diagram of the controller according to Embodiment 1.

A controller 50 for internal combustion engine (hereinafter, referred to simply as the controller 50) according to Embodiment 1 will be explained with reference to the drawings. FIG. 1 and FIG. 2 are a schematic configuration diagram of the internal combustion engine 1 and the controller 50; FIG. 3 is a block diagram of the controller 50 according to Embodiment 1. The internal combustion engine 1 and the controller 50 are mounted in a vehicle, and the internal combustion engine 1 functions as a driving-force source for the vehicle (wheels).

1-1. Configuration of Internal Combustion Engine 1

The configuration of the internal combustion engine 1 will be explained. As shown in FIG. 1, the internal combustion engine 1 is provided with cylinders 7 in which a fuel-air mixture is combusted. The internal combustion engine 1 is provided with an intake path 23 for supplying air to the cylinders 7 and an exhaust path 17 for discharging exhaust gas from the cylinders 7. The internal combustion engine 1 is a gasoline engine. The internal combustion engine 1 is provided with a throttle valve 4 which opens and closes intake path 23. The throttle valve 4 is an electronically controlled throttle valve which is opening/closing-driven by an electric motor controlled by controller 50. A throttle position sensor 19 which outputs an electric signal according to the opening degree of the throttle valve 4 is provided in the throttle valve 4.

An air flow sensor 3 which outputs an electric signal according to an intake air amount taken into the intake path 23 is provided in the intake path 23 on the upstream side of throttle valve 4. The internal combustion engine 1 is provided with an exhaust gas recirculation apparatus 20. The exhaust gas recirculation apparatus 20 has an EGR passage 21 which recirculates the exhaust gas from the exhaust path 17 to the intake manifold 12, and an EGR valve 22 which opens and closes the EGR passage 21. The intake manifold 12 is a part of the intake path 23 on the downstream side of the throttle valve 4. The EGR valve 22 is an electronic controlled EGR valve which is opening/closing-driven by an electric motor controlled by controller 50. An air-fuel ratio sensor 18 which outputs an electric signal according to an air-fuel ratio of exhaust gas in the exhaust path 17 is provided in the exhaust path 17.

A manifold pressure sensor 8 which outputs an electric signal according to a pressure in the intake manifold 12 is provided in the intake manifold 12. An injector 13 for injecting a fuel is provided on the downstream side part of the intake manifold 12. The injector 13 may be provided so as to inject a fuel directly into the cylinder 7. An atmospheric pressure sensor 33 which outputs an electric signal according to an atmospheric pressure is provided in the internal combustion engine 1.

An ignition plug for igniting a fuel-air mixture and an ignition coil 16 for supplying ignition energy to the ignition plug are provided on the top of the cylinder 7. An intake valve 14 for adjusting the amount of intake air to be taken from the intake path 23 into the cylinder 7 and an exhaust valve 15 for adjusting the amount of exhaust gas to be exhausted from the cylinder to the exhaust path 17 are provided on the top of the cylinder 7. The intake valve 14 is provided with an intake variable valve timing mechanism which makes the opening and closing timing thereof variable. The exhaust valve 15 is provided with an exhaust variable valve timing mechanism which makes the opening and closing timing thereof variable. Each of the variable valve timing mechanisms 14, 15 has an electric actuator.

As shown in FIG. 2, the internal combustion engine 1 has a plurality of cylinders 7 (in this example, three). A piston 5 is provided inside of the each cylinder 7. The piston 5 of each cylinder 7 is connected to a crankshaft 2 via a connecting rod 9 and a crank 32. The crankshaft 2 is rotated by reciprocating movement of the piston 5. A combustion gas pressure generated in each cylinder 7 presses the top face of the piston 5, and rotates the crankshaft 2 via the connecting rod 9 and the crank 32. The crankshaft 2 is connected with a power transfer mechanism which transmits driving force to the wheels. The power transfer mechanism is provided with a gearbox, a differential gear, and the like. The vehicle provided with the internal combustion engine 1 may be a hybrid vehicle provided with a motor generator in the power transfer mechanism.

The internal combustion engine 1 is provided with a signal plate 10 which rotates integrally with the crankshaft 2. A plurality of teeth are provided in the signal plate 10 at a plurality of preliminarily set crank angles. In the present embodiment, the teeth of the signal plate 10 are arranged at intervals of 10 degrees. The teeth of the signal plate 10 are provided with a chipped tooth part in which a part of teeth is chipped. The internal combustion engine 1 is provided with a first crank angle sensor 11 which is fixed to an engine block 24 and detects the tooth of the signal plate 10.

The internal combustion engine 1 is provided with a cam shaft 29 connected with crankshaft 2 via a chain 28. The cam shaft 29 carries out the opening-and-closing drive of the intake valve 14 and the exhaust valve 15. During the crankshaft 2 rotates two times, the cam shaft 29 rotates once. The internal combustion engine 1 is provided with a signal plate 31 for cam which rotates integrally with the cam shaft 29. A plurality of teeth are provided in the signal plate 31 for cam at a plurality of preliminarily set cam shaft angles. The internal combustion engine 1 is provided with a cam angle sensor 30 which is fixed to an engine block 24 and detects the tooth of signal plate 31 for cam.

Based on two kinds of output signals of the first crank angle sensor 11 and the cam angle sensor 30, the controller 50 detects the crank angle on the basis of the top dead center of each piston 5 and determines the stroke of each cylinder 7. The internal combustion engine 1 is a 4-stroke engine which has an intake stroke, a compression stroke, a combustion stroke, and an exhaust stroke.

The internal combustion engine 1 is provided with a flywheel 27 which rotates integrally with the crankshaft 2. The peripheral part of flywheel 27 is a ring gear 25, and a plurality of teeth are provided in the ring gear 25 at a plurality of preliminarily set crank angles. The teeth of the ring gear 25 are arranged in the peripheral direction with equiangular intervals. In this example, 90 teeth are provided with intervals of 4 degrees. The teeth of ring gear 25 are not provided with a chipped tooth part. The internal combustion engine 1 is provided with a second crank angle sensor 6 which is fixed to the engine block 24 and detects the tooth of the ring gear 25. The second crank angle sensor 6 is disposed oppositely to the ring gear 25 with a space in radial-direction outside of the ring gear 25. The opposite side of the flywheel 27 to the crankshaft 2 is connected with a power transfer mechanism. Accordingly, the output torque of the internal combustion engine 1 passes through a part of the flywheel 27, and is transmitted to the wheels side.

Each of the first crank angle sensor 11, the cam angle sensor 30, and the second crank angle sensor 6 outputs an electric signal according to change of the distance between each sensor and tooth by rotation of the crankshaft 2. The output signal of each angle sensor 11, 30, 6 becomes a rectangular wave that a signal turns on or off when the distance between sensor and tooth is near or when the distance is far. An electromagnetic pickup type sensor is used for each angle sensor 11, 30, 6, for example.

Since the flywheel 27 (the ring gear 25) has larger number of teeth than the number of teeth of the signal plate 10, and there is also no chipped tooth part, a high resolution angle detection can be expected. Since the flywheel 27 has larger mass than the mass of the signal plate 10 and high frequency vibration is suppressed, a high accuracy of angle detection can be expected.

1-2. Configuration of Controller 50

Figure 4:
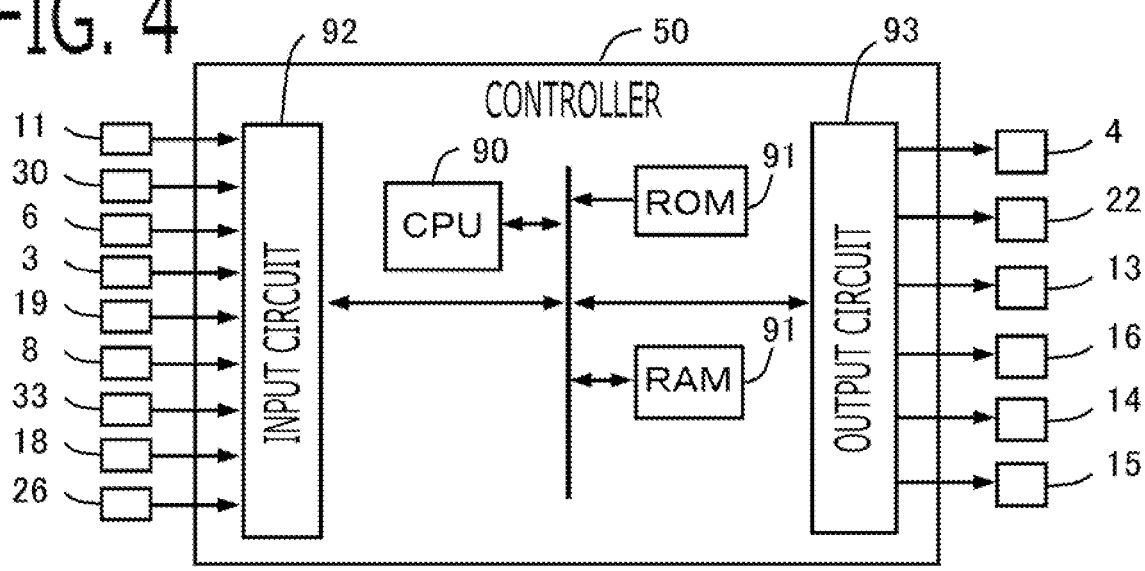
FIG. 4 is a hardware configuration diagram of the controller according to Embodiment 1.

Next, the controller 50 will be explained. The controller 50 is the one whose control object is the internal combustion engine 1. As shown in FIG. 3, the controller 50 is provided with control units such as an angle information detection unit 51, a torsional vibration determination unit 52, an angle information calculation unit 53, a gas pressure torque calculation unit 54, a combustion state estimation unit 55, a combustion control unit 56, and an unburning condition shaft torque learning unit 57. The respective control units 51 to 57 of the controller 50 are realized by processing circuits included in the controller 50. Specifically, as shown in FIG. 4, the controller 50 includes, as a processing circuit, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed.

As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 to 57 provided in the controller 50 are realized. Setting data items such as the first threshold value, the second threshold value, the filter coefficients, and the unburning condition data to be used in the control units 51 to 57 are stored, as part of software items (programs), in the storage apparatus 91 such as ROM and EEPROM. Each calculation value and each detection value, such as the crank angle θd, the angle period ΔTd, the angle period after the specific frequency reduction filter ΔTdf, the crank angle speed ωd, the crank angle acceleration ad, the actual shaft torque Tcrkd, the increment of gas pressure torque by burning ΔTgas_brn, and the gas pressure in cylinder in burning Pcyl_brn, which are calculated by each control unit 51 to 57, are stored in the storage apparatus 91, such as RAM.

In the present embodiment, the input circuit 92 is connected with the first crank angle sensor 11, the cam angle sensor 30, the second crank angle sensor 6, the air flow sensor 3, the throttle position sensor 19, the manifold pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, the intake-air variable valve timing mechanism 14, the exhaust-gas variable valve timing mechanism 15, and the like. The controller 50 is connected with various kinds of unillustrated sensors, switches, actuators, and the like. The controller 50 detects operating conditions of the internal combustion engine 1, such as an intake air amount, a pressure in the intake manifold, an atmospheric pressure, an air-fuel ratio, and an accelerator opening degree, based on the output signals of various sensors.

As basic control, the controller 50 calculates a fuel injection amount, an ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates an output torque of the internal combustion engine 1 demanded by the driver, and then controls the throttle valve 4 and the like so that an intake air amount for realizing the demanded output torque is obtained. Specifically, the controller 50 calculates a target throttle opening degree and then performs driving control of the electric motor of the throttle valve 4 so that the throttle opening degree which is detected based on the output signal of the throttle position sensor 19 approaches the target throttle opening degree. And, the controller 50 calculates a target opening degree of the EGR valve 22 based on inputted output signals and the like from the various kinds of sensors and then performs driving control of the electric motor of the EGR valve 22. The controller 50 calculates a target opening and closing timing of the intake valve and a target opening and closing timing of the exhaust valve based on the output signals of the various sensors, and performs driving control of the intake and the exhaust variable valve timing mechanisms 14, 15 based on each target opening and closing timing.

1-2-1. Angle Information Detection Unit 51

The angle information detection unit 51 detects a crank angle θd and an angle period ΔTd (in this example, a time interval ΔTd) which is a period of unit angle of the crankshaft, based on the output signal of the second crank angle sensor 6.

Figure 5:
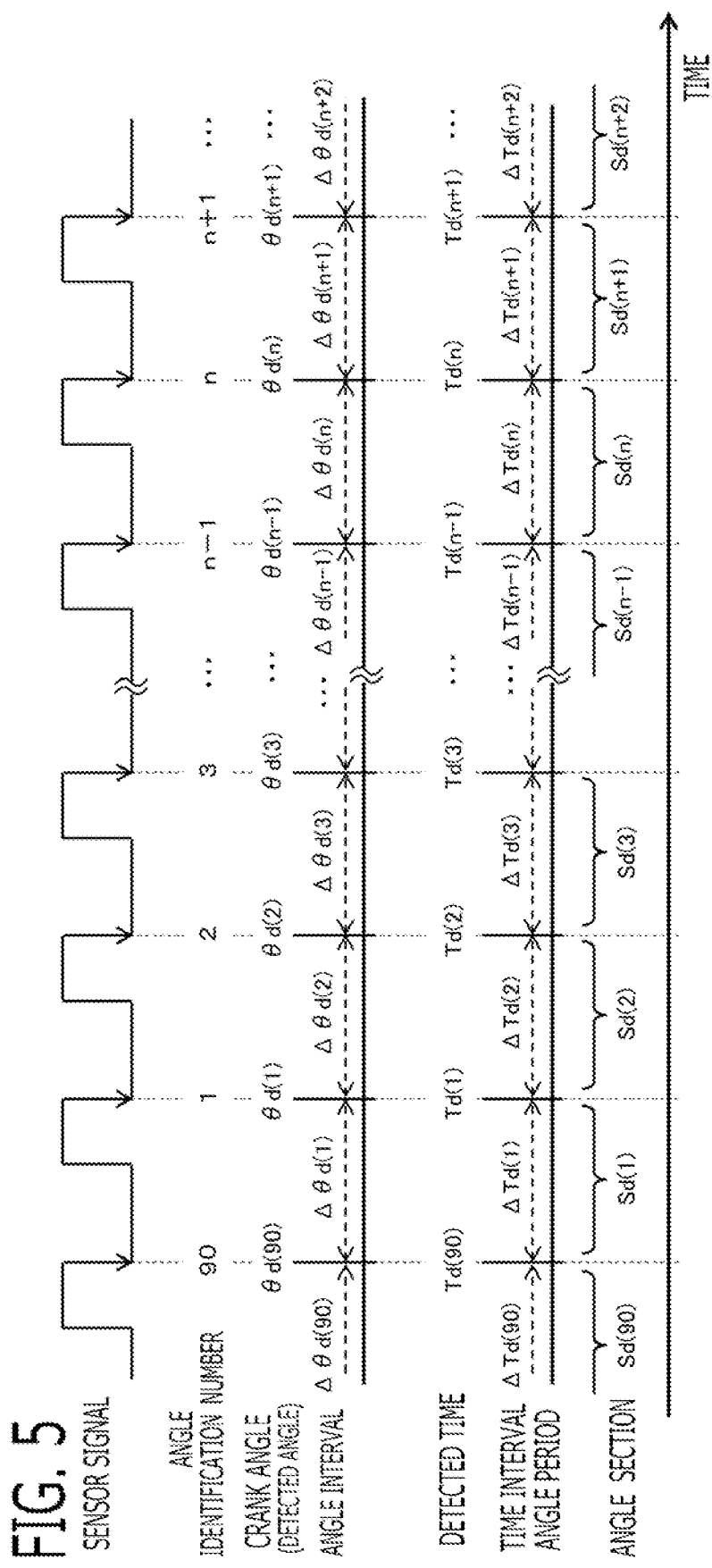
FIG. 5 is a time chart for explaining an angle information detection processing according to Embodiment 1.

In the present embodiment, as shown in FIG. 5, the angle information detection unit 51 detects the crank angle θd based on the output signal of the second crank angle sensor 6 and detects a detected time Td at which the crank angle θd is detected. Then, based on a detected angle θd which is the detected crank angle θd, and the detected time Td, the angle information detection unit 51 calculates an angle interval Δθd and a time interval ΔTd corresponding to an angle section Sd between the detected angles θd.

In the present embodiment, the angle information detection unit 51 determines the crank angle θd when a falling edge (or rising edge) of the output signal (rectangular wave) of the second crank angle sensor 6 is detected. The angle information detection unit 51 determines a basing point falling edge which is a falling edge corresponding to a basing point angle (for example, 0 degree which is a top dead center of the piston 5 of the first cylinder #1), and determines the crank angle θd corresponding to a number n of the falling edge which is counted up on the basis of the basing point falling edge (hereinafter, referred to as an angle identification number n). For example, when the basing point falling edge is detected, the angle information detection unit 51 sets the crank angle θd to the basing point angle (for example, 0 degree), and sets the angle identification number n to 1. Then, every time the falling edge is detected, the angle information detection unit 51 increases the crank angle θd by a preliminarily set angle interval Δθd (in this example, 4 degrees) and increases the angle identification number n by one. Alternatively, the angle information detection unit 51 may read out the crank angle θd corresponding to the this time identification number n, by use of an angle table in which a relationship between the angle identification number n and the crank angle θd is preliminarily set. The angle information detection unit 51 correlates the crank angle θd (the detected angle θd) with the angle identification number n. The angle identification number n returns to 1 after the maximum number (in this example, 90). The last time angle identification number n of the angle identification number n=1 is 90, and the next time angle identification number n of the angle identification number n=90 is 1.

In the present embodiment, as described later, the angle information detection unit 51 determines the basing point falling edge of the second crank angle sensor 6 with reference to a reference crank angle detected based on the first crank angle sensor 11 and the cam angle sensor 30. For example, the angle information detection unit 51 determines the falling edge at which the reference crank angle when the falling edge of the second crank angle sensor 6 is detected becomes the closest to the basing point angle, as the basing point falling edge.

The angle information detection unit 51 determines the stroke of each cylinder 7 corresponding to the crank angle θd with reference to the stroke of each cylinder 7 determined based on the first crank angle sensor 11 and the cam angle sensor 30.

The angle information detection unit 51 detects a detected time Td when the falling edge of the output signal (rectangular wave) of the second crank angle sensor 6 is detected, and correlates the detected time Td with the angle identification number n. Specifically, the angle information detection unit 51 detects the detected time Td using the timer function provided in the arithmetic processor 90.

As shown in FIG. 5, when the falling edge is detected, the angle information detection unit 51 sets the angle section between the detected angle θd(n) corresponding to the this time angle identification number (n) and the detected angle θd(n−1) corresponding to the last time angle identification number (n−1), as the angle section Sd(n) corresponding to the this time angle identification number (n).

As shown in an equation (1), when the falling edge is detected, the angle information detection unit 51 calculates a deviation between the detected angle θd(n) corresponding to the this time angle identification number (n) and the detected angle θd(n−1) corresponding to the last time angle identification number (n−1), and sets the calculated deviation as the angle interval Δθd(n) corresponding to the this time angle identification number (n) (the this time angle section Sd(n)).

$$\Delta\theta d = \theta d(n) - \theta d(n-1) \quad (1)$$

In the present embodiment, since all the angle intervals of the tooth of ring gear 25 are made equal, the angle information detection unit 51 sets the angle interval Δθd of all the angle identification numbers n as a preliminarily set angle (in this example, 4 degrees).

As shown in the equation (2), when the falling edge is detected, the angle information detection unit 51 calculates a deviation between the detected time Td(n) corresponding to the this time angle identification number (n) and the detected time Td(n−1) corresponding to the last time angle identification number (n−1), and sets the calculated deviation as the time interval ΔTd(n) corresponding to the this time angle identification number (n) (the this time angle section Sd(n)). The time interval ΔTd is an angle period which is a period of unit angle (in this example, 4 degrees).

$$\Delta Td(n) = Td(n) - Td(n-1) \quad (2)$$

Based on two kinds of output signals of the first crank angle sensor 11 and the cam angle sensor 30, the angle information detection unit 51 detects the reference crank angle on the basis of the top dead center of the piston 5 of the first cylinder #1, and determines the stroke of each cylinder 7.

<High Frequency Reduction Filter Processing>

The angle information detection unit 51 performs a high frequency reduction filter processing which reduces a high frequency component caused by the production variation of the teeth and the like, to the angle period ΔTd (the time interval ΔTd). As the high frequency reduction filter processing, for example, a finite impulse response (FIR) filter is used.

For example, as the FIR filter, the processing shown in the equation (3) is performed.

$$\Delta TdFH(n) = \sum_{j=0}^{N} b_j \Delta Td(n-j) \quad (3)$$

Herein, ΔTdfH(n) is an angle period (time interval) after the high frequency reduction filter, N is an order of the filter, and bj is a coefficient of the filter.

The angle information detection unit 51 performs the high frequency reduction filter processing with the same filter characteristics between the unburning condition and the burning condition. In this example, the order N of the filter and the each coefficient of the filter are set to the same values between the unburning condition and the burning condition.

The high frequency reduction filter processing may be performed to the crank angle speed cod (n) described below, instead of the angle period ΔTd. Alternatively, the high frequency reduction filter processing may not be performed to the angle period ΔTd.

Instead of the high frequency reduction filter processing or with the high frequency reduction filter processing, the angle information detection unit 51 may correct the angle period ΔTd(n) of each angle identification number n by a correction coefficient Kc(n) which is set corresponding to each angle identification number n. The correction coefficients Kc(n) are learned based on the angle period ΔTd (n) using the method disclosed in JP 6169214 B and the like, or are preliminarily set by matching in production.

The angle information detection unit 51 stores angle information, such as the angle identification number n, the crank angle θd(n), the angle periods before and after the high frequency reduction filter ΔTd(n), ΔTdfH(n), to the storage apparatus 91 such as RAM, during a period longer than the analysis period described below. In the following, the angle period after the high frequency reduction filter ΔTdfH and the angle period ΔTd to which high frequency reduction filter processing is not performed are not distinguished especially but are simply referred to as the angle period ΔTd.

1-2-2. Torsional Vibration Determination Unit 52

The torsional vibration determination unit 52 determines whether the torsional vibration occurs in the crankshaft, based on the angle period ΔTd. As the angle period ΔTd, the angle period before the high frequency reduction filter which reduces the high frequency component may be used, and the angle period after the high frequency reduction filter may be used. The torsional vibration determination unit 52 may determine whether the torsional vibration occurs in the crankshaft, based on the crank angle speed corresponding to a reciprocal of the angle period ΔTd.

In the torsional vibration of the crankshaft, a component of a resonance frequency of a torsional vibration system around the crankshaft becomes large. Then, the torsional vibration determination unit 52 calculates a strength Isp of a component of a specific frequency fsp corresponding to a frequency of a torsional vibration included in the angle period ΔTd, by performing a frequency analysis to the angle period ΔTd, and determines presence or absence of occurrence of the torsional vibration, based on the strength Isp of the component of the specific frequency.

In the present embodiment, the torsional vibration determination unit 52 calculates the strength of each frequency component, by performing a fast Fourier transform to a plurality of angle periods ΔTd detected in the analysis period. Then, the torsional vibration determination unit 52 extracts and outputs the strength Isp of the specific frequency component from the calculated strength of each frequency component. Since the frequency of the torsional vibration becomes lower than a rotational frequency normally, the analysis period is set to a period longer than a rotation period. Since the frequency of the torsional vibration changes according to the rotational speed, the specific frequency fsp is set based on the rotational speed.

Instead of the frequency analysis, a band pass filter processing which passes the component of the specific frequency fsp may be used. The torsional vibration determination unit 52 may always perform the frequency analysis or the band pass filter processing, and determine presence or absence of occurrence of the torsional vibration. Alternatively, the torsional vibration determination unit 52 may perform the frequency analysis or the band pass filter processing in a specific operating condition (for example, just after misfire) in which the torsional vibration easily occurs, and determine presence or absence of occurrence of the torsional vibration. In this case, in operating condition other than the specific operating condition, it is determined that the torsional vibration does not occur.

Figure 6:
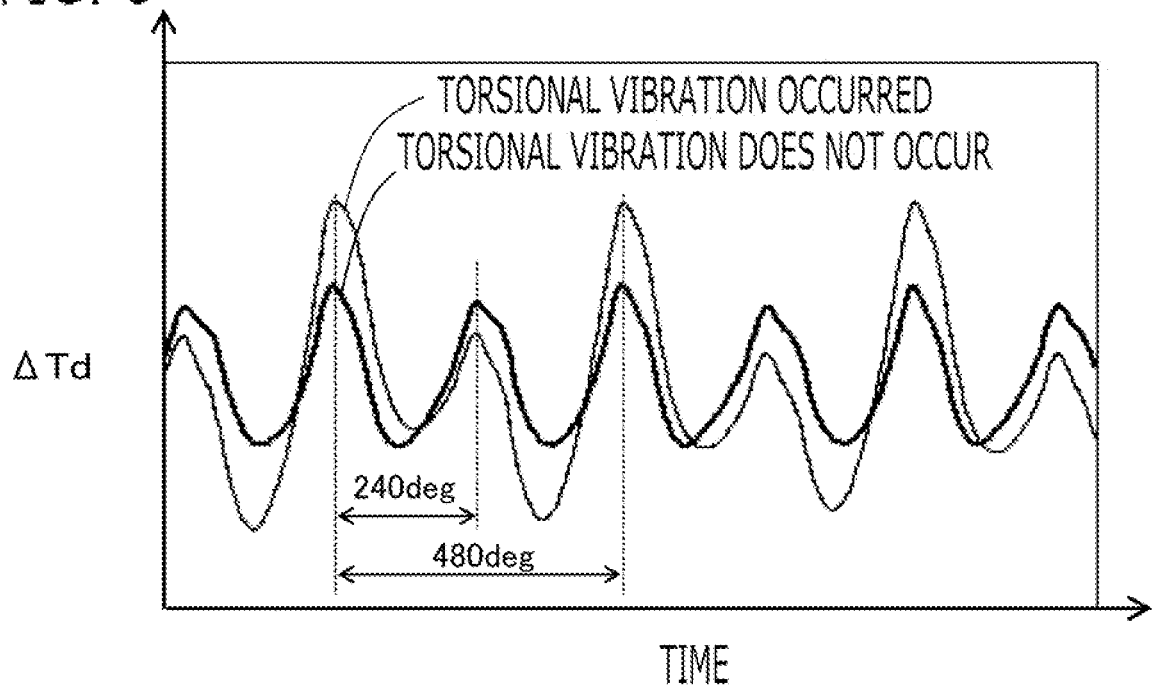
FIG. 6 is a time chart for explaining the behavior of the angle period in presence or absence of the torsional vibration according to Embodiment 1.

FIG. 6 shows a time chart of the angle period ΔTd when the torsional vibration occurs and when the torsional vibration does not occur. This example is an example of the 3-cylinder engine, the combustion period is a period of 240 degrees, and the torsional vibration period is a period of 480 degrees.

Figure 7:
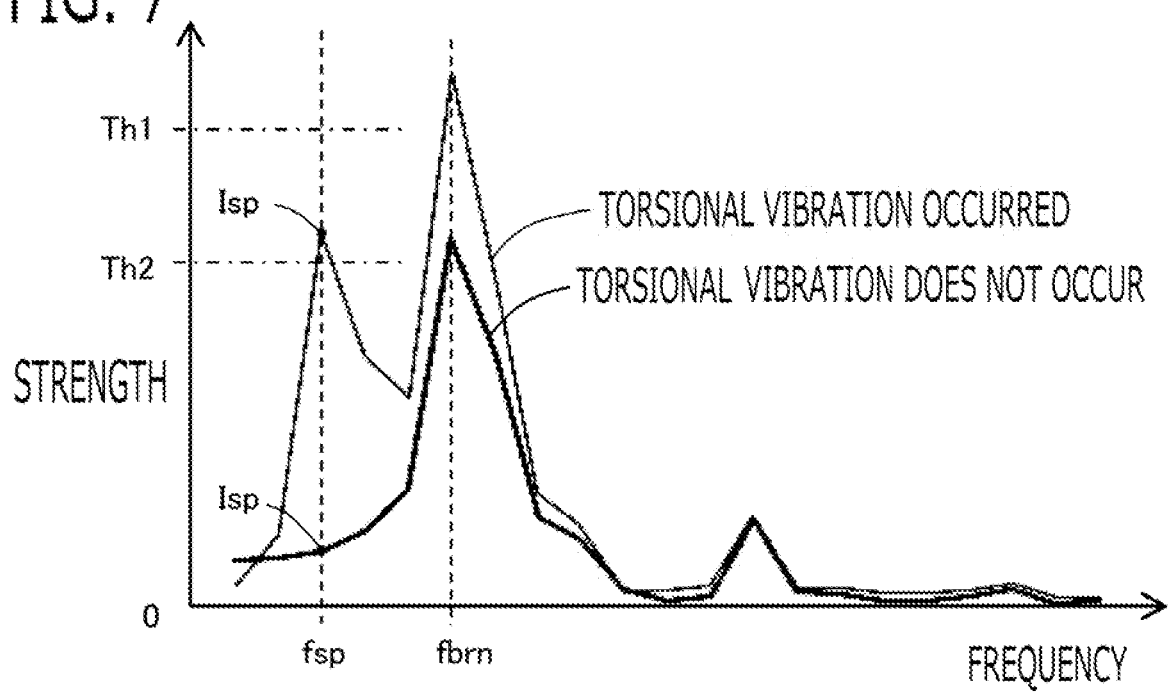
FIG. 7 is a figure showing the frequency spectrum of the angle period in presence or absence of the torsional vibration according to Embodiment 1.

FIG. 7 shows the frequency analysis result of FIG. 6. When the torsional vibration does not occur, the component of the combustion frequency fbrn of 240 degrees becomes high, and the strength Isp of the component of the specific frequency fsp corresponding to the frequency of the torsional vibration of 480 degrees becomes low. When the torsional vibration occurred, the strength Isp of the component of the specific frequency fsp corresponding to the frequency of the torsional vibration of 480 degrees is larger than that when the torsional vibration does not occur. It is seen from this figure that it can determined that the torsional vibration occurred, when the strength Isp of the specific frequency component corresponding to the frequency of the torsional vibration becomes large.

As shown in FIG. 7, when the strength Isp of the component of the specific frequency is larger than a first threshold value Th1, the torsional vibration determination unit 52 determines that the torsional vibration occurred. When the torsional vibration component included in the angle period becomes large, as described later, even if the specific frequency reduction filter processing which reduces the torsional vibration component is performed to the angle period, the estimation accuracy of the gas pressure torque in burning is deteriorated. Accordingly, as described later, the estimation of the combustion state is stopped.

When the strength Isp of the component of the specific frequency is less than or equal to the first threshold value Th1, and is larger than a second threshold value Th2 which is set to a value smaller than the first threshold value Th1, the torsional vibration determination unit 52 determines that an allowable torsional vibration occurred. When the torsional vibration occurred and the torsional vibration component included in the angle period is comparatively small, as described later, if the specific frequency reduction filter processing which reduces the torsional vibration component is performed to the angle period, the estimation accuracy of the gas pressure torque in burning can be improved. Accordingly, as described later, the estimation of the combustion state is performed.

When the strength Isp of the component of the specific frequency fsp is less than or equal to the second threshold value Th2, the torsional vibration determination unit 52 determines that the torsional vibration does not occur. In this case, the specific frequency reduction filter processing which reduces the component of the specific frequency fsp as described later and an angle period is not performed, but estimation of the combustion state is performed.

1) When $Isp > Th1$

Determining that the torsional vibration occurred→Stopping estimation of combustion state 2) When $Th1 \geq Isp > Th2$ Determining that the allowable torsional vibration occurred
→Performing specific frequency reduction filter processing an estimation of combustion state 3) When $Th2 > Isp$ (4)

Determining that the torsional vibration does not occur
→Not performing specific frequency reduction filter processing, but performing estimation of combustion state Each of the first threshold value Th1 and the second threshold value Th2 is set by multiplying each of the first coefficient K1 and the second coefficient K2 to the strength Ispnrm of the specific frequency component when the torsional vibration does not occur.

$Th1 = Ispnrm \times K1$ $Th2 = Ispnrm \times K2$ (5)

Each of the first coefficient K1 and the second coefficient K2 may be set by using a coefficient setting map data in which a relationship between the operating condition, such as the rotational speed and the charging efficiency, and each coefficient is preliminarily set. The strength Ispnrm of the specific frequency component when the torsional vibration does not occur may be calculated by performing a statistical processing, such as a low pass filter processing, to the strength Isp of the specific frequency component. Alternatively, each of the first threshold value Th1 and the second threshold value Th2 may be set, by using a threshold setting map data in which a relationship between the operating condition, such as the rotational speed and the charging efficiency, and each threshold value is preliminarily set. The threshold setting map data may be updated based on the strength Isp of the specific frequency component calculated in the operating condition other than the specific operating condition which the torsional vibration easily occurs.

The frequency analysis and the determination of presence or absence of the torsional vibration is performed based on the angle periods ΔTd in the analysis period stored in the storage apparatus 91, after the burning period ends.

1-2-3. Angle Information Calculation Unit 53

<Specific Frequency Reduction Filter Processing>

The angle information calculation unit 53 calculates a crank angle acceleration αd based on the angle period ΔTd. When it is determined that the allowable torsional vibration occurred, the angle information calculation unit 53 performs the specific frequency reduction filter processing which reduces the component of the specific frequency fsp, to the angle period ΔTd.

As the specific frequency reduction filter processing, a high pass filter processing which attenuates the component of the specific frequency fsp and passes the frequency component which is generated by burning is used. As the specific frequency reduction filter processing, the FIR filter shown by the equation (3) may be used. The filter coefficients and the order of the filter are set in accordance with the specific frequency fsp. Since the specific frequency fsp is changed according to the rotational speed, the filter coefficients and the order of the filter may be set based on the rotational speed.

Alternatively, the high frequency reduction filter processing which attenuates the component of the high frequency of the equation (3), and the specific frequency reduction filter processing which attenuates the component of the specific frequency fsp may be combined and performed. That is to say, a band pass filter processing which attenuates the component of high frequency and the component of the specific frequency fsp, and passes the frequency component which is generated by burning may be performed. In this case, when it is determined that the torsional vibration does not occur, the filter coefficients and the order of the filter which attenuate the component of high frequency and pass the frequency component which is generated by burning are set. When it is determined that the allowable torsional vibration occurred, the filter coefficients and the order of the filter which attenuates the component of high frequency and the component of the specific frequency fsp and pass the frequency component which is generated by burning are set. That is to say, the filter coefficients and the order of the filter are switched based on the determination result of the torsional vibration.

When it is determine that the allowable torsional vibration occurred, the angle information calculation unit 53 changes characteristics of the specific frequency reduction filter processing based on the strength Isp of the specific frequency component. The filter coefficients and the order of the filter may be changed so that the attenuation rate of the specific frequency component become large, as the strength Isp of the specific frequency component becomes large.

On the other hand, when it is determined that the torsional vibration does not occur, the angle information calculation unit 53 does not perform the specific frequency reduction filter processing which reduces the component of the specific frequency fsp, to the angle period ΔTd.

When it is determined that the torsional vibration occurred, the angle information calculation unit 53 may perform the specific frequency reduction filter processing to the angle period ΔTd, or may not perform it.

<Calculation of Crank Angle Speed and Crank Angle Acceleration>

When the specific frequency reduction filter processing is performed to the angle period ΔTd, the angle information calculation unit 53 calculates the crank angle speed ωd which is a time change rate of the crank angle θd, and the crank angle acceleration αd which is a time change rate of the crank angle speed ωd based on the angle period after the specific frequency low pass filter ΔTdf. When the specific frequency reduction filter processing is not performed, the angle information calculation unit 53 calculates the crank angle speed ωd and the crank angle acceleration αd based on the angle period ΔTd to which the specific frequency reduction filter processing is not performed.

Figures 8, 9:
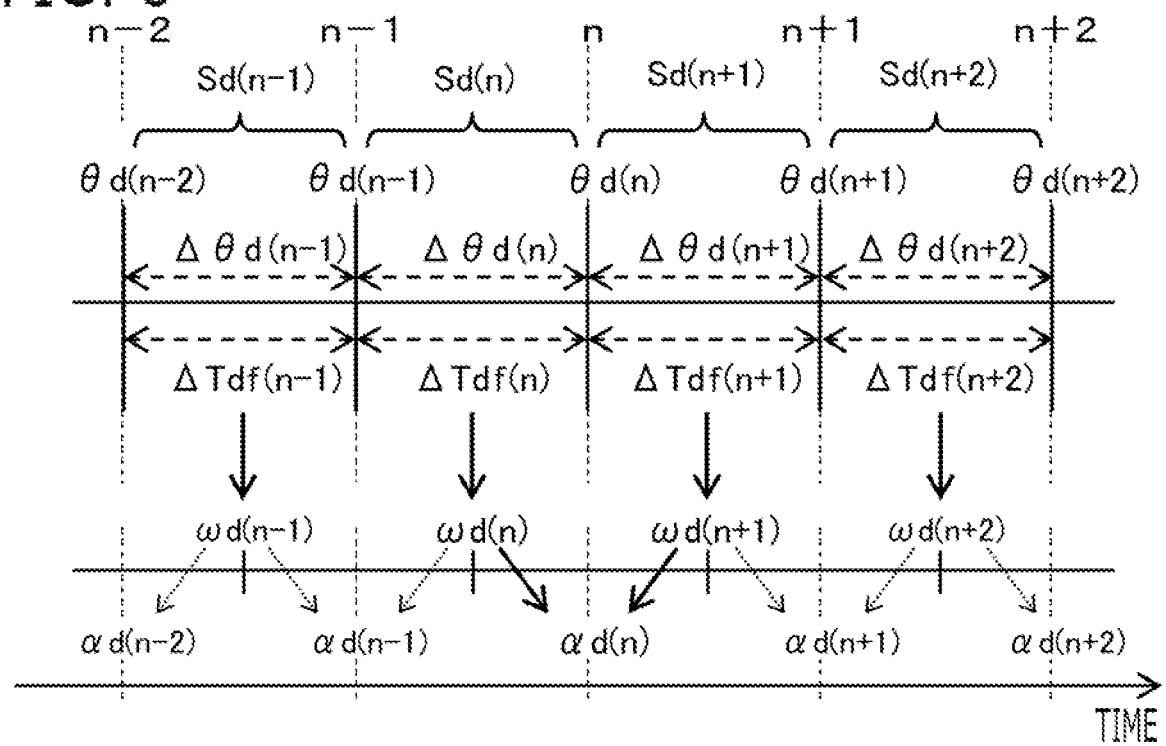
FIG. 8 is a time chart for explaining the angle information calculation processing according to Embodiment 1.
FIG. 9 is a figure for explaining the unburning condition data according to Embodiment 1.

In the present embodiment, as shown in FIG. 8, the angle information calculation unit 53 calculates the crank angle speed ωd (n) corresponding to the angle interval Sd(n) of the processing object, based on the angle interval Δθd(n) and the angle period after the specific frequency low pass filter ΔTdf (n) (or the angle period ΔTd (n) to which the specific frequency reduction filter processing is not performed) corresponding to the angle interval Sd(n) of the processing object. Specifically, as shown in the next equation, the angle information calculation unit 53 calculates the crank angle speed ωd (n), by dividing the angle interval after correction Δθdc(n) corresponding to the angle interval Sd(n) of the processing object, by the angle period after the specific frequency low pass filter ΔTdf (n) (or the angle period ΔTd (n) to which the specific frequency reduction filter processing is not performed).

$$\omega d(n) = \frac{\Delta \theta d(n)}{\Delta T df(n)} \times \frac{\pi}{180} \qquad (6)$$

As shown in the next equation, the angle information calculation unit 53 calculates the crank angle acceleration αd(n) corresponding to the detected angle θd(n) of the processing object, based on the crank angle speed ωd(n) and the angle period after the specific frequency low pass filter ΔTdf (n) (or the angle period ΔTd(n)) corresponding to the one angle interval Sd(n) just before the detected angle θd (n) of the processing object, and the crank angle speed ωd (nil) and the angle period after the specific frequency low pass filter ΔTdf(n+1) (or the angle period ΔTd(n+1)) corresponding to the one angle interval Sd(n+1) just after the detected angle of the processing object θd(n).

$$\alpha d(n) = \frac{\omega d(n+1) - \omega d(n)}{\Delta T df(n+1) + \Delta T df(n)} \times 2 \qquad (7)$$

The specific frequency reduction filter processing to the angle period ΔTd, and the calculation of the crank angle speed ωd and the crank angle acceleration αd are collectively performed using the angle periods ΔTd of the object period stored in the storage apparatus 91, after the burning period ended and the determination of presence or absence of the torsional vibration was performed.

The angle information calculation unit 53 stores angle information, such as the angle period after the specific frequency low pass filter ΔTdf(n) which reduces the component of the specific frequency fsp, the crank angle speed ωd(n), and the crank angle acceleration αd(n), to the storage apparatus 91 such as RAM, together with angle information, such as the corresponding angle identification number n, and the crank angle θd, during a period at least longer than the combustion stroke.

1-2-4. Gas Pressure Torque Calculation Unit 54

The gas pressure torque calculation unit 54 calculates a gas pressure torque which is applied to the crankshaft by a gas pressure in cylinder, based on the detection value of crank angle acceleration αd, at each crank angle of the arithmetic object. In the present embodiment, when it is determined that the torsional vibration does not occur, or when it is determined that the allowable torsional vibration occurred, the gas pressure torque calculation unit 54 calculates the gas pressure torque. When it is determined that the torsional vibration occurred, the gas pressure torque calculation unit 54 does not calculate the gas pressure torque.

In the present embodiment, the gas pressure torque calculation unit 54 calculates an increment of gas pressure torque by burning ΔTgas_brn which is included in the gas pressure torque. In the following, the calculation of the increment of gas pressure torque by burning ΔTgas_brn will be explained in detail.

<Calculation of Actual Shaft Torque Tcrkd>

The gas pressure torque calculation unit 54 calculates an actual shaft torque Tcrkd applied to the crankshaft, based on the detection value of the crank angle acceleration αd, at each crank angle θd of the arithmetic object.

In the present embodiment, as shown in the next equation, the gas pressure torque calculation unit 54 calculates the actual shaft torque Tcrkd by multiplying the inertia moment Icrk of the crankshaft system to the detection value of crank angle acceleration αd at each crank angle θd.

$$Tcrkd = \alpha d \times Icrk \quad (8)$$

The inertia moment Icrk of the crankshaft system is an inertia moment of the whole member which rotates integrally with the crankshaft 2 (for example, the crankshaft 2, the crank 32, the flywheel 27, and the like), and is preliminarily set.

<Calculation of Shaft Torque in Unburning>

By referring to an unburning condition data in which a relationship between the crank angle θd and the shaft torque in unburning Tcrk_mot is set, the gas pressure torque calculation unit 54 calculates the shaft torque in unburning Tcrk_mot corresponding to each crank angle θd of the arithmetic object.

The unburning condition data is set for each crank angle θd in the crank angle interval which includes at least the combustion stroke. The unburning condition data is preliminarily set based on the experimental data, and is stored in the storage apparatus 91 such as ROM or EEPROM. In the present embodiment, the unburning condition data which is updated based on the actual shaft torque in unburning Tcrkd_mot by the unburning condition shaft torque learning unit 57 described below is used.

The unburning condition data may be set corresponding to the combustion stroke of each cylinder. For example, the unburning condition data may be set for each crank angle θd of the four cycles.

The unburning condition data is set for every operating condition which influences at least the gas pressure in cylinder and the reciprocation inertia torque of the piston. By referring to the unburning condition data corresponding to the present operating condition, the gas pressure torque calculation unit 54 calculates the shaft torque in unburning Tcrk_mot corresponding to each crank angle θd.

In the present embodiment, the operating condition concerning setting of the unburning condition data is set to any one or more of the rotational speed of the internal combustion engine, the intake gas amount in the cylinder, the temperature, and the opening and closing timing of one or both of the intake valve and the exhaust valve. The rotational speed of the internal combustion engine corresponds to the crank angle speed cod. As the intake gas amount in the cylinder, the gas amount of EGR gas and air taken into the cylinder, the charging efficiency, the gas pressure in the intake pipe (in this example, the pressure in the intake manifold), or the like is used. As the temperature, the gas temperature taken into the cylinder, the cooling water temperature, the oil temperature, or the like is used. As the opening and closing timing of the intake valve, the opening and closing timing of the intake valve by the intake variable valve timing mechanism 14 is used. As the opening and closing timing of the exhaust valve, the opening and closing timing of the exhaust valve by the exhaust variable valve timing mechanism 15 is used.

For example, as the unburning condition data, the map data in which a relationship between the crank angle θd and the shaft torque in unburning Tcrk_mot as shown in FIG. 9 is set for every operating condition is stored in the storage apparatus 91. Instead of the map data, an approximation function, such as a polynomial or a neural network, may be used.

<Calculation of External Load Torque>

The gas pressure torque calculation unit 54 calculates the actual shaft torque Tcrkd_tdc based on the detection value of the crank angle acceleration αd, at the crank angle θd_tdc in the vicinity of the top dead center. By referring the unburning condition data, the gas pressure torque calculation unit 54 calculates the shaft torque in unburning Tcrk_mot_tdc corresponding to the crank angle θd_tdc in the vicinity of the top dead center. Herein, the vicinity of the top dead center is within an angle interval from 10 degrees before the top dead center to 10 degrees after the top dead center, for example. For example, the crank angle θd_tdc in the vicinity of the top dead center is preliminarily set to the crank angle of the top dead center.

The gas pressure torque calculation unit 54 calculates an external load torque Tload which is a torque applied to the crankshaft from the outside of the internal combustion engine, based on the actual shaft torque Tcrkd_tdc and the shaft torque in unburning Tcrk_mot_tdc of the crank angle θd_tdc in the vicinity of the top dead center. In the present embodiment, as shown in the next equation, the gas pressure torque calculation unit 54 calculates the external load torque in burning Tload by subtracting the actual shaft torque in the vicinity of the top dead center Tcrkd_tdc from the shaft torque in unburning Tcrk_mot_tdc in the vicinity of the top dead center.

$$Tload = Tcrk\_mot\_tdc - Tcrkd\_tdc \quad (9)$$

Since the gas pressure torque of the combustion cylinder becomes about 0 in the vicinity of the top dead center of the combustion stroke, the external load torque Tload can be calculated with small arithmetic load, based on the shaft torque in unburning Tcrk_mot_tdc in the vicinity of the top dead center, and the actual shaft torque in burning Tcrkd_tdc in the vicinity of the top dead center.

<Calculation of Increment of Gas Pressure Torque by Burning>

Figure 10:
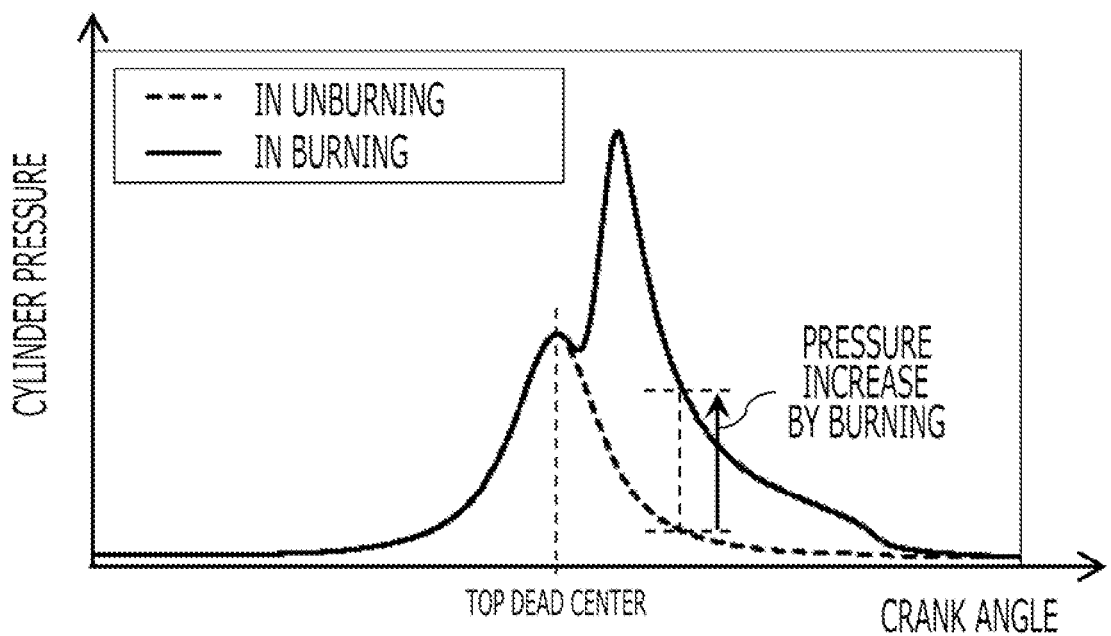
FIG. 10 is a figure explaining the cylinder pressure in unburning and the cylinder pressure in burning according to Embodiment 1.

As shown in FIG. 10, the gas pressure in cylinder in burning increases by a pressure increase by burning more than the gas pressure in cylinder in unburning. As shown in the next equation, the actual shaft torque in burning Tcrkd increases by an increment of shaft torque ΔTgas_brn generated by this pressure increment by burning more than the shaft torque in unburning Tcrk_mot. Since this increment of shaft torque ΔTgas_brn is an increment of gas pressure torque generated by the gas pressure increase which is an increase from the gas pressure in cylinder in unburning to the gas pressure in cylinder in burning, it is referred to as an increment of gas pressure torque by burning ΔTgas_brn.

The gas pressure torque calculation unit 54 calculates the increment of gas pressure torque by burning ΔTgas_brn, based on the actual shaft torque Tcrkd, the shaft torque in unburning Tcrk_mot, and the external load torque Tload, at each crank angle θd of the arithmetic object. In the present embodiment, as shown in the next equation, the gas pressure torque calculation unit 54 calculates the increment of gas pressure torque by burning ΔTgas_brn, by subtracting the shaft torque in unburning Tcrk_mot from the actual shaft torque Tcrkd, and adding the external load torque Tload.

$$\Delta Tgas\_brn = Tcrkd - Tcrk\_mot + Tload \qquad (10)$$

As described above, for calculation of the increment of gas pressure torque by burning ΔTgas_brn, the actual shaft torque in burning Tcrkd and the shaft torque in unburning Tcrk_mot are used. Accordingly, since the physical model equation of the crank mechanism is not used like the equation (15) of JP 6029726 B, the modeling error can be reduced. And, in the equation (15) of JP 6029726 B, since the generated torque of unburning assumption on which the high frequency error component is not superimposed is subtracted from the actual shaft torque in burning on which the high frequency error component is superimposed, a high frequency error component is superimposed on the calculated pressure in cylinder in burning. On the other hand, according to the above configuration, the high frequency error component included in the actual shaft torque in burning Tcrkd and the high frequency error component included in the shaft torque in unburning Tcrk_mot can be canceled with each other. And, the high frequency error component can be reduced from the increment of gas pressure torque by burning ΔTgas_brn. Therefore, even if the high frequency error component is included in the detection value of the crank angle acceleration αd and the modeling of the crank mechanism is not easy, the estimation accuracy of parameter relevant to the combustion state can be improved.

The calculation of the increment of gas pressure torque ΔTgas_brn of each crank angle is collectively performed using the crank angle accelerations ad and the like of the object period stored in the storage apparatus 91, after the burning period ended, and the determination of presence or absence of the torsional vibration and the calculation of the crank angle acceleration αd were performed.

The gas pressure torque calculation unit 54 stores each calculation value, such as the actual shaft torque Tcrkd, the shaft torque in unburning Tcrk_mot, and the increment of gas pressure torque by burning ΔTgas_brn which are calculated at each crank angle θd of the arithmetic object, to the storage apparatus 91 such as RAM, together with angle information such as corresponding the angle identification number n and the crank angle θd.

1-2-5. Combustion State Estimation Unit 55

The combustion state estimation unit 55 estimates a combustion state of the internal combustion engine, based on the gas pressure torque by burning. In the present embodiment, when it is determined that the torsional vibration does not occur, or when it is determined that the allowable torsional vibration occurred, the combustion state estimation unit 55 estimates the combustion state. When it is determined that the torsional vibration occurred, the combustion state estimation unit 55 stops the estimation of the combustion state. According to this configuration, when the torsional vibration occurred, and the estimation accuracy of the combustion state based on the angle information will be deteriorated, the estimation is stopped and the inaccurate combustion state can be prevented from estimating.

In the present embodiment, the combustion state estimation unit 55 estimates the combustion state of the internal combustion engine, based on the increment of gas pressure torque by burning ΔTgas_brn. The combustion state estimation unit 55 is provided with a cylinder pressure calculation unit 551 and a combustion parameter calculation unit 552.

1-2-5-1. Cylinder Pressure Calculation Unit 551

<Calculation of Gas Pressure in Cylinder in Unburning>

At each crank angle θd of the arithmetic object, the cylinder pressure calculation unit 551 calculates a gas pressure in cylinder in unburning Pcyl_mot when assuming that it is unburning, based on the current condition of the intake gas amount in cylinder (in this example, the current gas pressure in intake pipe Pin).

In the present embodiment, the cylinder pressure calculation unit 551 calculates the gas pressure in cylinder in unburning Pcyl_mot, using the next equation expressing the polytropic change.

$$Pcyl\_mot = \left(\frac{Vcyl0}{Vcyl\_\theta}\right)^{Nply} \times Pin \qquad (11)$$

$$Vcyl\_\theta = Vcyl0 - Sp \times r\left\{(1+\cos(\theta d)) - \frac{r}{L}(1+\cos(2\times\theta d))\right\}$$

Herein, Nply is a polytropic index, and a preliminarily set value is used. Vcyl0 is the cylinder volume of the combustion cylinder at valve closing of the intake valve. A preliminarily set value may be used for Vcyl0, or Vcyl0 may be changed according to the valve closing timing of the intake valve by the intake variable valve timing mechanism 14. Vcly_θ is the cylinder volume of the burning cylinder at the crank angle θd. Sp is a projection area of the top face of the piston. r is the crank length. L is the length of the connecting rod. As the crank angle θd used for the calculation of the trigonometric function, the angle that the top dead center of the compression stroke of the burning cylinder is set to 0 degree is used.

<Calculation of Gas Pressure in Cylinder in Burning>

Then, at each crank angle θd of the arithmetic object, the cylinder pressure calculation unit 551 calculates the gas pressure in cylinder in burning Pcyl_brn, based on the gas pressure in cylinder in unburning Pcyl_mot and the increment of gas pressure torque by burning ΔTgas_brn.

In the present embodiment, at each crank angle θd of the arithmetic object, the cylinder pressure calculation unit 551 calculates an increment of gas pressure in cylinder by burning ΔPcyl_brn, based on the increment of gas pressure torque by burning ΔTgas_brn. For example, the cylinder pressure calculation unit 551 calculates the increment of gas pressure in cylinder by burning ΔPcyl_brn using the next equation.

$$\Delta Pcyl\_brn = \frac{\Delta Tgas\_brn}{Sp \times R\_brn} \quad (12)$$

$$R\_brn = r\left\{\sin(\theta d) - \frac{1}{2}\frac{r}{L}\cos(2 \times \theta d)\right\}$$

Then, as shown in the next equation, at each crank angle θd of the arithmetic object, the cylinder pressure calculation unit 551 calculates the gas pressure in cylinder in burning Pcyl_brn, by adding the gas pressure in cylinder in unburning Pcyl_mot and the increment of gas pressure in cylinder by burning ΔPcyl_brn.

$$Pcyl\_brn = Pcyl\_mot + \Delta Pcyl\_brn \quad (13)$$

The gas pressure in cylinder in burning Pcyl_brn of each crank angle θd is collectively calculated based on the increments of gas pressure torque ΔTgas_brn and the like of the object period stored in the storage apparatus 91, after the burning period ended and the increment of gas pressure torque ΔTgas_brn was calculated.

The cylinder pressure calculation unit 551 stores the gas pressure in cylinder in burning Pcyl_brn to the storage apparatus 91 such as RAM, together with angle information such as corresponding the angle identification number n and the crank angle θd, during a period at least longer than the estimation crank angle interval θint.

1-2-5-2. Combustion Parameter Calculation Unit 552

The combustion parameter calculation unit 552 calculates a combustion parameter showing the combustion state, based on the gas pressure in cylinder in burning Pcyl_brn of each crank angle θd of the arithmetic object. For example, at least one or more of a heat release rate, a mass combustion rate MFB, and an indicated mean effective pressure IMEP are calculated as the combustion parameter. Other kind of combustion parameter may be calculated.

In the present embodiment, using the next equation, the combustion parameter calculation unit 552 calculates the heat release rate dQ/dθd per unit crank angle at each crank angle θd of the arithmetic object.

$$\frac{d(Q)}{d(\theta d)} = \frac{\kappa}{\kappa-1} Pcyl\_brn \frac{d(Vcyl\_\theta)}{d(\theta d)} + \frac{1}{\kappa-1} Vcyl\_\theta \frac{d(Pcyl\_brn)}{d(\theta d)} \quad (14)$$

Herein, κ is a ratio of specific heat. Vcly_θ is a cylinder volume of the combustion cylinder at each crank angle θd, and is calculated as explained using the second equation of the equation (11). At each crank angle θd of the arithmetic object, the combustion parameter calculation unit 552 performs a calculation processing which calculates the heat release rate dQ/dθd. The calculated heat release rate dQ/dθd of each crank angle θd is stored to the storage apparatus 91, such as RAM, similar to other calculation values.

Using the next equation, the combustion parameter calculation unit 552 calculates the mass combustion rate MFB of each crank angle θd of the arithmetic object, by dividing a section integral value obtained by integrating the heat release rate dQ/dθd from the start angle θ0 of the arithmetic object to each crank angle θd of the arithmetic object, by an all integral value Q0 obtained by integrating the heat release rate dQ/dθd for over the whole estimation crank angle interval θint. At each crank angle θd of the arithmetic object, the combustion parameter calculation unit 552 performs a calculation processing which calculates the mass combustion rate MFB. The calculated mass combustion rate MFB of each crank angle θd is stored to the storage apparatus 91, such as RAM, similar to other calculation values.

$$MFB = \frac{\int_{\theta 0}^{\theta d\_obj} \frac{d(Q)}{d(\theta d)} d(\theta d)}{Q0} \quad (15)$$

About each combustion cylinder, using the next equation, the combustion parameter calculation unit 552 calculates the indicated mean effective pressure IMEP by integrating the gas pressure in cylinder in burning Pcyl_brn with respect to the cylinder volume Vcly_θ of the combustion cylinder.

$$IMEP = \frac{1}{Vcylall} \int_{Vcyls}^{Vcyle} Pcyl\_brn \ d(Vcyl\_\theta) \quad (16)$$

Herein, Vcylall is a stroke volume, Vcyls is a cylinder volume at integral start, and Vclye is a cylinder volume at integral end. The volume interval for integration may be set to a volume interval corresponding to at least the estimation crank angle interval θint, or may be set to a volume interval corresponding to the four cycles. Vcly_θ is calculated based on the crank angle θd, as shown in the second equation of the equation (11). At each crank angle θd of the arithmetic object, the combustion parameter calculation unit 552 performs an integration processing of the gas pressure in cylinder in burning Pcyl_brn.

1-2-6. Combustion Control Unit 56

The combustion control unit 56 performs a combustion control which changes at least one or both of the ignition timing and the EGR amount, based on the estimated combustion state (in this example, the combustion parameter). In the present embodiment, when it is determined that the torsional vibration does not occur, or when it is determined that the allowable torsional vibration occurred, the combustion control unit 56 performs the combustion control based on the combustion state. When it is determined that the torsional vibration occurred, since the combustion state is not estimated, the combustion control unit 56 stops the combustion control based on the combustion state.

In the present embodiment, the combustion control unit 56 determines a crank angle θd at which the mass combustion rate MFB becomes 0.5 (50%) (referred to as a combustion central angle), and changes at least one or both of the ignition timing and the EGR amount so that the combustion central angle approaches a preliminarily set target angle. For example, when the combustion central angle is on the retard angle side than the target angle, the combustion control unit 56 changes the ignition timing to the advance angle side, or decreases the opening degree of the EGR valve 22 so as to decrease the EGR amount. When the EGR amount is decreased, a combustion speed becomes fast and the combustion central angle changes to the advance angle side. On the other hand, when the combustion central angle is on the advance angle side than the target angle, the combustion control unit 56 changes the ignition timing to the retard angle side, or increases the opening degree of the EGR valve 22 so as to increase the EGR amount.

Alternatively, the combustion control unit 56 may determine a crank angle θd at which the heat release rate dQ/dθd becomes a maximum value, and change at least one or both of the ignition timing and the EGR amount so that this crank angle θd approaches a preliminarily set target angle.

Alternatively, the combustion control unit 56 may changes at least one or both of the ignition timing and the EGR amount so that the indicated mean effective pressure IMEP approaches a target value which is set for every operating condition.

Other control parameters (for example, the opening and closing timing of the intake valve, the opening and closing timing of the exhaust valve) related to the combustion state may be changed.

1-2-7. Unburning Condition Shaft Torque Learning Unit 57

In the unburning condition of the internal combustion engine, at each crank angle θd, the unburning condition shaft torque learning unit 57 calculates the actual shaft torque Tcrkd based on the detection value of the crank angle acceleration αd similar to the burning condition, and updates the unburning condition data by the calculated actual shaft torque in unburning Tcrkd. In the present embodiment, when it is determined that the torsional vibration does not occur, the unburning condition shaft torque learning unit 57 performs the update of the unburning condition data. When it is determined that the allowable torsional vibration or the torsional vibration occurred, the unburning condition shaft torque learning unit 57 stops the update of the unburning condition data.

For example, the unburning condition for updating the unburning condition data is a condition where the fuel cut is carried out, or a condition where the internal combustion engine is driven by the driving force from the outside of the internal combustion engine (for example, driving force of the motor, driving force transmitted from the wheels) in the unburning condition.

In the present embodiment, the unburning condition shaft torque learning unit 57 refers to the unburning condition data stored in the storage apparatus 91 and reads out the shaft torque in unburning Tcrk_mot corresponding to the crank angle θd of the update object; and changes the shaft torque in unburning Tcrk_mot of the crank angle θd of the update object which is set in the unburning condition data stored in the storage apparatus 91, so that the read shaft torque in unburning Tcrk_mot approaches the actual shaft torque in unburning Tcrkd_mot calculated at the crank angle θd of the update object.

A change amount from the initial unburning condition data which is preliminarily set based on experimental data and stored in ROM or EEPROM may be stored in the backup RAM or the like, as a change amount of unburning condition data and be updated. Then, a total value of a value read from the preliminarily set initial unburning condition data and a value read from the change amount of unburning condition data may be used as the final shaft torque in unburning Tcrk_mot.

As mentioned above, in the present embodiment, since the unburning condition data is set for every operating condition, the unburning condition data corresponding to the operating condition in which the actual shaft torque in unburning Tcrkd_mot is calculated is updated. The change amount of unburning condition data is set for every operating condition similar to the initial unburning condition data. In the case where the neural network is used for the unburning condition data or the change amount of unburning condition data, the actual shaft torque in unburning Tcrkd_mot and the like are set as teacher data, and the neural network is learned by the back propagation or the like.

A high pass filter processing which attenuates components of period longer than the stroke period may be performed to the actual shaft torque in unburning Tcrkd_mot used for updating. By this high pass filter processing, the external load torque Tload included in the actual shaft torque in unburning Tcrkd_mot can be reduced, and it can be suppressed that the updated unburning condition data is fluctuated by fluctuation of the external load torque Tload.

The unburning condition shaft torque learning unit 57 may update the shaft torque in unburning Tcrk_mot of each crank angle θd which is set in the unburning condition data, by a value obtained by performing a statistical processing to the actual shaft torques in unburning Tcrkd_mot of plural times which are calculated at each crank angle θd in the combustion strokes of plural times in the unburning condition. As the statistical processing value, an average value, a median, or the like is used. For example, the shaft torque in unburning Tcrk_mot of each crank angle θd set in the unburning condition data is replaced or brought close to the statistical processing value of each crank angle θd.

Alternatively, the unburning condition shaft torque learning unit 57 updates the shaft torque in unburning Tcrk_mot of each crank angle θd which is set in the unburning condition data, by a value obtained by performing a low pass filter processing of each crank angle θd to the actual shaft torque in unburning Tcrkd_mot calculated at each crank angle θd in the unburning condition. About each crank angle θd, individually, the filter processing is performed and the filter value is calculated. As the low pass filter processing, for example, the finite impulse response (FIR) filter mentioned above, a first order lag filter, or the like is used. The shaft torque in unburning Tcrk_mot of each crank angle θd which is set in the unburning condition data is replaced or brought close to the filter value of each crank angle θd.

<Outline Flowchart of Whole Processing>

Figure 11:
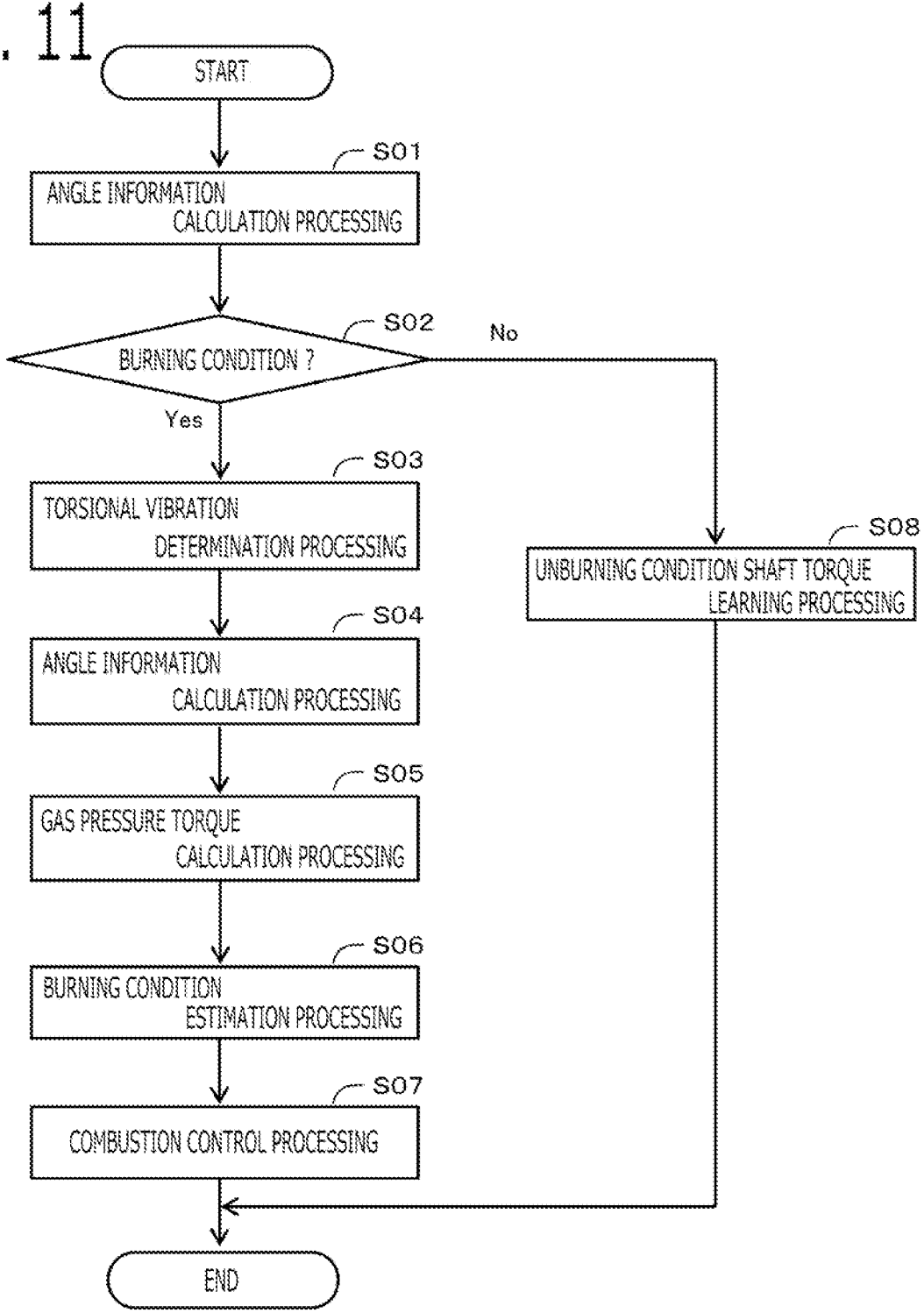
FIG. 11 is a flowchart showing the procedure of schematic processing of the controller according to Embodiment 1.

A procedure of schematic processing of the controller 50 (a control method of internal combustion engine) concerning the present embodiment will be explained based on the flow chart shown in FIG. 11. The processing of the flowchart in FIG. 11 is recurrently executed every time when the crank angle θd is detected or when the burning period ends, by the arithmetic processor 90 executing software (a program) stored in the storage apparatus 91.

In the step S01, as mentioned above, the angle information detection unit 51 performs an angle information detection processing (an angle information detection step) that detects the crank angle θd and the angle period ΔTd which is a period of unit angle of the crankshaft, based on the output signal of the second crank angle sensor 6.

In the step S02, the controller 50 determines whether it is the burning condition of the internal combustion engine or it is the unburning condition of the internal combustion engine. When it is the burning condition, it advances to the step S03, and when it is the unburning condition, it advances to the step S08. Herein, "burning condition" and "in burning" are a condition and a time that the controller 50 controls so as to burn fuel in the combustion stroke. And, "unburning condition" and "in unburning" are a condition and a time that the controller 50 controls so as not to burn fuel in the combustion stroke.

In the step S03, as mentioned above, the torsional vibration determination unit 52 performs a torsional vibration determination processing (a torsional vibration determination step) that determines whether the torsional vibration occurs in the crankshaft, based on the angle period ΔTd. In the present embodiment, when the strength Isp of the component of the specific frequency is larger than the first threshold value Th1, the torsional vibration determination unit 52 determines that the torsional vibration occurred. When the strength Isp of the component of the specific frequency is less than or equal to the first threshold value Th1, and is larger than a second threshold value Th2 which is set to a value smaller than the first threshold value Th1, the torsional vibration determination unit 52 determines that the allowable torsional vibration occurred. When the strength Isp of the component of the specific frequency fsp is less than or equal to the second threshold value Th2, the torsional vibration determination unit 52 determines that the torsional vibration does not occur.

In the step S04, as mentioned above, the angle information calculation unit 53 performs an angle information calculation processing (an angle information calculation step) that calculates the crank angle acceleration $\alpha d$ based on the angle period $\Delta Td$. When it is determined that the allowable torsional vibration occurred, the angle information calculation unit 53 performs the specific frequency reduction filter processing which reduces the component of the specific frequency fsp, to the angle period $\Delta Td$.

In the step SOS, as mentioned above, the gas pressure torque calculation unit 54 performs a gas pressure torque calculation processing (a gas pressure torque calculation step) that calculates the gas pressure torque which is applied to the crankshaft by the gas pressure in cylinder, based on the detection value of crank angle acceleration $\alpha d$, at each crank angle of the arithmetic object. In the present embodiment, when it is determined that the torsional vibration does not occur, or when it is determined that the allowable torsional vibration occurred, the gas pressure torque calculation unit 54 calculates the gas pressure torque. When it is determined that the torsional vibration occurred, the gas pressure torque calculation unit 54 does not calculate the gas pressure torque.

In the step S06, as mentioned above, the combustion state estimation unit 55 performs a combustion state estimation processing (a combustion state estimation step) that estimates the combustion state of the internal combustion engine, based on the gas pressure torque by burning. In the present embodiment, when it is determined that the torsional vibration does not occur, or when it is determined that the allowable torsional vibration occurred, the combustion state estimation unit 55 estimates the combustion state. When it is determined that the torsional vibration occurred, the combustion state estimation unit 55 stops the estimation of the combustion state.

In the step S07, as mentioned above, the combustion control unit 56 performs a combustion control processing (a combustion control step) that changes at least one or both of the ignition timing and the EGR amount, based on the estimated combustion state. In the present embodiment, when it is determined that the torsional vibration does not occur, or when it is determined that the allowable torsional vibration occurred, the combustion control unit 56 performs the combustion control based on the combustion state. When it is determined that the torsional vibration occurred, since the combustion state is not estimated, the combustion control unit 56 stops the combustion control based on the combustion state.

On the other hand, in the case of the unburning condition of the internal combustion engine, in the step S08, as mentioned above, the unburning condition shaft torque learning unit 57 performs an unburning condition shaft torque learning processing (an unburning condition shaft torque learning step) that calculates the actual shaft torque Tcrkd based on the detection value of the crank angle acceleration $\alpha d$ similar to the burning condition, and updates the unburning condition data by the calculated actual shaft torque in unburning Tcrkd, at each crank angle $\theta d$, in the unburning condition of the internal combustion engine. In the present embodiment, when it is determined that the torsional vibration does not occur, the unburning condition shaft torque learning unit 57 performs the update of the unburning condition data. When it is determined that the allowable torsional vibration or the torsional vibration occurred, the unburning condition shaft torque learning unit 57 stops the update of the unburning condition data.

OTHER EMBODIMENTS

Other embodiments of the present disclosure will be described. Each of the configurations of embodiments to be explained below is not limited to be separately utilized but can be utilized in combination with the configurations of other embodiments as long as no discrepancy occurs.

(1) In the above Embodiment 1, there was explained the case where the crank angle $\theta d$, the crank angle speed $\omega d$, and the crank angle acceleration $\alpha d$ are detected based on the output signal of the second crank angle sensor 6. However, based on the output signal of the first crank angle sensor 11, the crank angle $\theta d$, the crank angle speed $\omega d$, and the crank angle acceleration $\alpha d$ may be detected.

(2) In the above Embodiment 1, there was explained the case where the 3-cylinder engine whose cylinder number is three is used. However, the engine of any cylinder numbers (for example, 1-cylinder, 2-cylinder, 4-cylinder, 6-cylinder) may be used.

(3) In the above Embodiment 1, there was explained the case where the internal combustion engine 1 is a gasoline engine. However, embodiments of the present disclosure are not limited to the foregoing case. That is to say, the internal combustion engine 1 may be various kinds of internal combustion engines, such as a diesel engine and an engine which performs HCCI combustion (Homogeneous-Charge Compression Ignition Combustion). In this case, instead of the ignition timing used for setting of the arithmetic object, a predicted value of ignited timing may be used.

(4) In the above Embodiment 1, there was explained the case where the controller 50 calculates the gas pressure in cylinder in burning Pcyl_brn based on the increment of gas pressure torque by burning $\Delta Tgas\_brn$ and the like, calculates the combustion parameter of one or both of the heat release rate and the mass combustion rate MFB based on the gas pressure in cylinder in burning Pcyl_brn, and estimates the combustion state of the internal combustion engine. However, without calculating the gas pressure in cylinder in burning Pcyl_brn and the combustion parameter, the controller 50 may estimate the combustion state based on a behavior of the increment of gas pressure torque by burning $\Delta Tgas\_brn$ (for example, an integration value in the combustion stroke, a peak value in the combustion stroke, the crank angle at the peak value, or the like). Alternatively, without calculating the combustion parameter, the controller 50 may estimate the combustion state based on a behavior of the gas pressure in cylinder in burning Pcyl_brn (for example, an integration value in the combustion stroke, a peak value in the combustion stroke, the crank angle at the peak value, or the like).

(5) In the above Embodiment 1, there was explained the case where the controller 50 calculates the heat release rate and the mass combustion rate based on the gas pressure in cylinder in burning Pcyl_brn, and performs the combustion control. However, the controller 50 may perform other controls, such as a misfire detection of combustion cylinder, based on the increment of gas pressure torque by burning ΔTgas_brn, the gas pressure in cylinder in burning Pcyl_brn, or the heat release rate.

(6) In the above Embodiment 1, there was explained the case where the shaft torque in unburning Tcrk_mot is calculated with reference to the unburning condition data. However, in the case where the unburning condition data is set only for a specific operating condition, such as an execution region of fuel cut, the shaft torque in unburning Tcrk_mot may be calculated based on a generated torque calculated using the physical model equation of the crank mechanism in addition to the unburning condition data of the specific operating condition.

Specifically, at the crank angle θd of the arithmetic object, by referring a specific unburning condition data in which a relationship between the crank angle θd and a shaft torque in unburning of the specific operating condition is set, the gas pressure torque calculation unit 54 calculates the shaft torque in unburning of the specific operating condition corresponding to each crank angle θd of the arithmetic object. At each crank angle θd of the arithmetic object, using the physical model equation of the crank mechanism, the gas pressure torque calculation unit 54 calculates the generated torque of unburning assumption of the specific operating condition which is a torque generated by the gas pressure in cylinder and the reciprocating movement of piston when assuming that it is the specific operating condition and it is unburning.

At each crank angle θd of the arithmetic object, using the physical model equation of the crank mechanism, the gas pressure torque calculation unit 54 calculates the generated torque of unburning assumption of the current operating condition which is a torque generated by the gas pressure in cylinder and the reciprocating movement of piston when assuming that it is unburning in the current operating condition. At each crank angle θd of the arithmetic object, the gas pressure torque calculation unit 54 calculates the shaft torque in unburning Tcrk_mot, by correcting the generated torque of unburning assumption of the current operating condition, based on the shaft torque in unburning of the specific operating condition and the generated torque of unburning assumption of the specific operating condition. As the physical model equation of the crank mechanism, the same equation as the second term and the third term of the numerator of the right side of the equation (15) of JP 6169214 B may be used.

The unburning condition shaft torque learning unit 57 updates the specific unburning condition data by the actual shaft torque in unburning Tcrkd which was calculated at each crank angle θd in the unburning condition of the internal combustion engine and the specific operating condition.

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A controller for internal combustion engine, comprising at least one processor configured to implement:
   an angle information detector that detects a crank angle and an angle period which is a period of unit angle of a crankshaft, based on an output signal of a crank angle sensor;
   a torsional vibration determiner that determines whether a torsional vibration occurs in the crankshaft, based on the angle period;
   an angle information calculator that calculates a crank angle acceleration, based on the angle period;
   a gas pressure torque calculator that calculates a gas pressure torque in burning which is generated by a gas pressure in cylinder when air-fuel mixture is burning, at each crank angle of arithmetic object, based on the crank angle acceleration;
   a combustion state estimator that estimates a combustion state of an internal combustion engine, based on the gas pressure torque in burning; and
   a combustion controller that changes at least one or both of an ignition timing and an EGR amount, based on the combustion state,
   wherein when it is determined that the torsional vibration occurred, the combustion state estimator stops estimation of the combustion state, and the combustion controller stops change of at least one or both of the ignition timing and the EGR amount based on the combustion state.

2. The controller for internal combustion engine according to claim 1,
   wherein the torsional vibration extracts a component of a specific frequency corresponding to a frequency of the torsional vibration included in the angle period, by performing a frequency analysis or a band pass filter processing to the angle period, and calculates an amplitude of the extracted component of the specific frequency; and determines presence or absence of occurrence of the torsional vibration, based on the amplitude of the component of the specific frequency.

3. The controller for internal combustion engine according to claim 2,
   wherein when the amplitude of the component of the specific frequency is larger than a first threshold value, the torsional vibration determiner determines that the torsional vibration occurred.

4. The internal combustion engine controller according to claim 3,
   wherein when the amplitude of the component of the specific frequency is less than or equal to the first threshold value, and is larger than a second threshold value which is set to a value smaller than the first threshold value, the torsional vibration determiner determines that an allowable torsional vibration occurred;
   when it is determined that the allowable torsional vibration occurred, the angle information calculator performs a specific frequency reduction filter processing which reduces a component of a specific frequency, to the angle period, and calculates the crank angle acceleration based on the angle period after the specific frequency reduction filter; and
   when it is determined that the allowable torsional vibration occurred, the combustion state estimator performs estimation of the combustion state.

5. The controller for internal combustion engine according to claim 4,
    wherein when it is determined that the allowable torsional vibration occurred, the angle information calculator changes characteristics of the specific frequency reduction filter processing, based on the amplitude of the component of the specific frequency.

6. The controller for internal combustion engine according to claim 4,
    wherein when the amplitude of the component of the specific frequency is less than or equal to the second threshold value, the torsional vibration determiner determines that the torsional vibration does not occur; and
    when it is determined that the torsional vibration does not occur, the angle information calculator does not perform the specific frequency reduction filter processing, but calculates the crank angle acceleration based on the angle period.

7. The controller for internal combustion engine according to claim 5,
    wherein when the amplitude of the component of the specific frequency is less than or equal to the second threshold value, the torsional vibration determiner determines that the torsional vibration does not occur; and
    when it is determined that the torsional vibration does not occur, the angle information calculator does not perform the specific frequency reduction filter processing, but calculates the crank angle acceleration based on the angle period.

* * * * *